United States Patent [19]
Mohr

[11] Patent Number: 4,856,093
[45] Date of Patent: Aug. 8, 1989

[54] OPTICAL HETERODYNE RECEIVER

[75] Inventor: Friedemann Mohr, Renningen, Fed. Rep. of Germany

[73] Assignee: Alcatel N.V., Amsterdam, Netherlands

[21] Appl. No.: 67,960

[22] Filed: Jun. 29, 1987

[30] Foreign Application Priority Data

Jun. 28, 1986 [DE] Fed. Rep. of Germany ....... 3621734

[51] Int. Cl.[4] .............................................. H04B 9/00
[52] U.S. Cl. ..................................... 455/619; 455/611
[58] Field of Search ............... 455/619, 617, 616, 611; 350/326, 403; 370/2

[56] References Cited

U.S. PATENT DOCUMENTS

| 3,971,930 | 7/1976 | Fitzmaurice et al. | 455/616 |
| 4,718,120 | 1/1988 | Tzeng | 455/616 |

FOREIGN PATENT DOCUMENTS

| 0149025 | 9/1983 | Japan | 455/619 |
| 8607513 | 12/1986 | World Int. Prop. O. | 455/619 |

OTHER PUBLICATIONS

"Electronics Letters", Sep. 12th, 1985, vol. 21; No. 19; Hodgkinson et al.; *Demodulation of Optical DPSK Using In-phase and Quadrature Detection;* pp. 867-868.

*Primary Examiner*—Benedict V. Safourek
*Assistant Examiner*—Andrew J. Telesz, Jr.
*Attorney, Agent, or Firm*—Christie, Parker & Hale

[57] ABSTRACT

Optical heterodyne receivers for ASK-, PSK-, FSK-, and DPSK-modulated signals are disclosed which contain a polarization controller. The receiver contains a unit (Q, Q') which works on the difference-detector principle to eliminate the shot noise of the local oscillator (LO), which emits circularly polarized light. It further includes a quadrature demodulator (D, D', D") which, besides delivering the useful signal (N), provides polarization control signals ($S_E$, $S_W$) with which the ellipticity and the polarization angle of the received light ($E_S$) are adjusted in such a way that the received light ($E_S$) is linearly polarized at an angle of 45° or 135°.

8 Claims, 3 Drawing Sheets

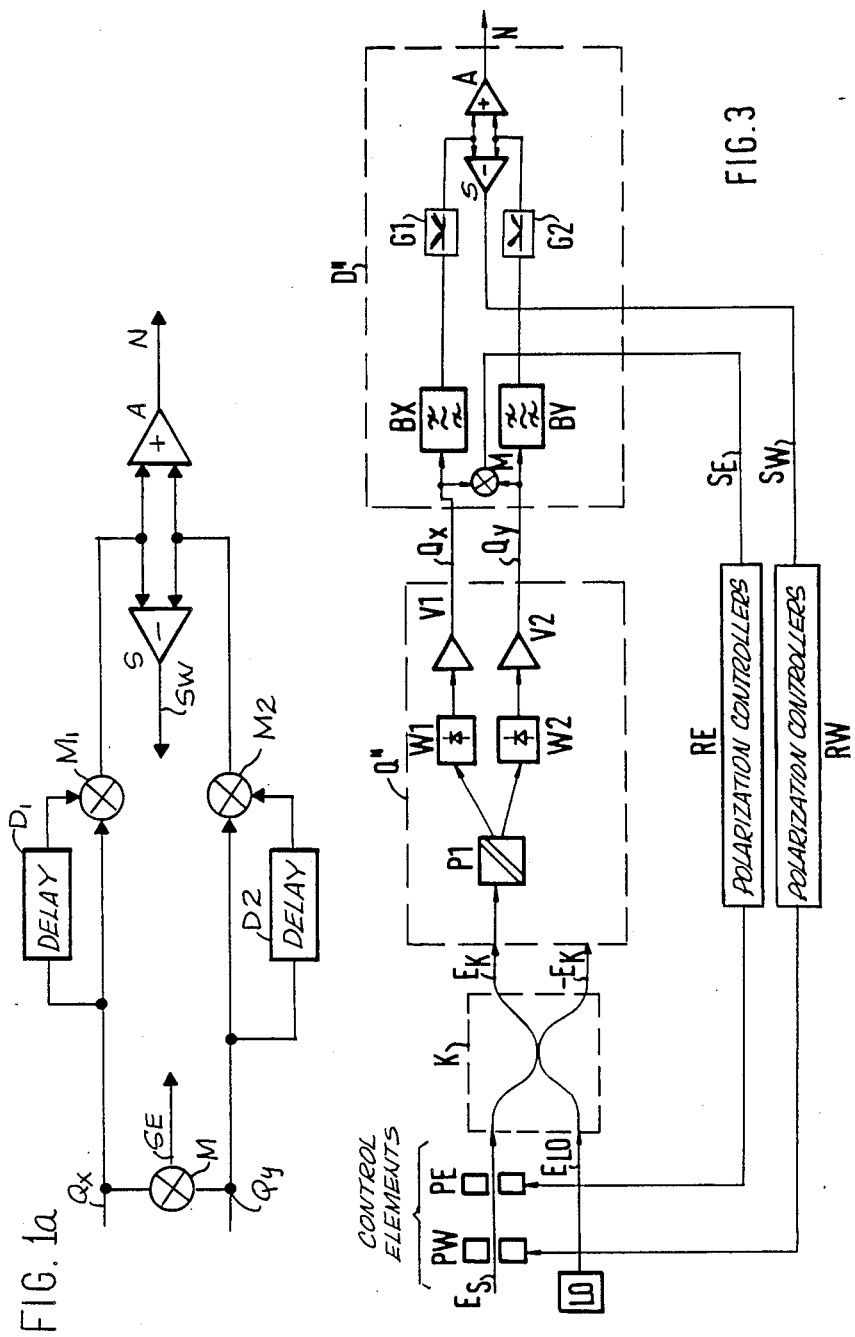

OPTICAL HETERODYNE RECEIVER

TECHNICAL FIELD

The present invention relates to an optical heterodyne receiver.

BACKGROUND ART

An optical heterodyne receiver for ASK- and DPSK-modulated signals is described in "Electronics Letters," Sept. 12, 1985, Vol. 21, No. 19, pp. 867–868. The two input ports of a 2×2 fiber coupler are presented with linearly polarized light and circularly polarized light, respectively, and one of the output ports of the coupler is connected to a polarization-selective beam splitter delivering two light signals in quadrature which, after separate optical-to-electric conversion and demodulation, are added together to form a useful signal. To improve the sensitivity of the receiver, an automatic polarization controller is proposed which is independent of the receiver (see FIG. 1 of the cited article).

DISCLOSURE OF INVENTION

It is an overall objective of the present invention to provide simple, accurate and reliable polarization control for an optical heterodyne receiver for ASK-, PSK-, FSK-, of DPSK-modulated optical signals.

The receiver contains an optical-to-electrical converter/detector unit which works on the difference-detector principle to eliminate the shot noise of the local optical oscillator. It further includes a novel quadrature demodulator which, besides delivering the required demodulated output signal also provides polarization control signals. In response to these polarization control signals, a polarization controller adjusts the linearly polarized input to the optical-to-electrical converter/detector unit such that it is linearly polarized, preferably at an angle of 45° or 135°.

The novel heterodyne receiver has the advantage of being suitable for the reception of signals modulated at very high bit rates, because its intermediate frequency, at least with AK-, PSK-, and DPSK-modulated signals, can be very low compared with the signal band-width.

BRIEF DESCRIPTION OF DRAWINGS

Several embodiments of the invention will now be explained with reference to the accompanying drawings, in which:

FIG. 1 shows an optical receiver for A-modulated signals and FIG. 1a shows a variant thereof for DPSK-modulated signals;

FIG. 3 shows an optical receiver for FSK-modulated signals.

BEST MODE FOR CARRYING OUT THE INVENTION

Figure 1:
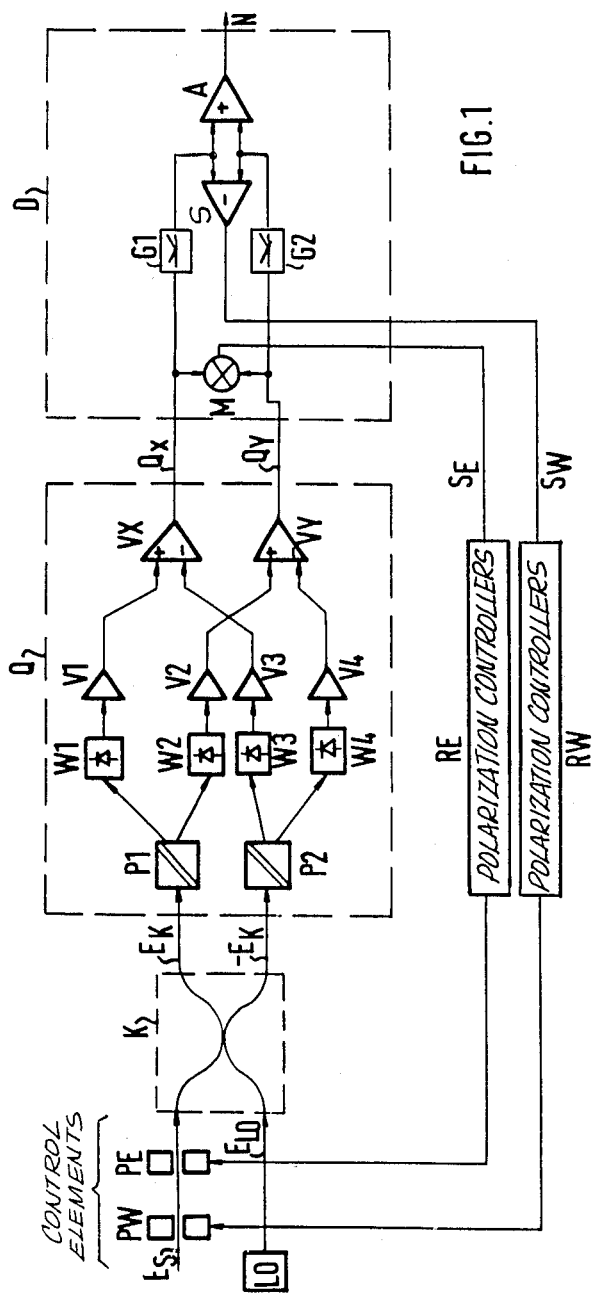

As shown in FIG. 1, the optical heterodyne receiver contains a non-polarizing, non-birefringent coupler K, one input port of which is presented with light $E_s$ from an optical transmitter which has passed through two successive polarization control elements PW, PE connected ahead of the coupler K, while the other input port is presented with circularly polarized light $E_LO$ from a local oscillator LO. Let $$E_S = |E_S|(\exp(ivt))$$

and $$E_{LO} = |E_{LO}|(\exp(iwt)).$$

According to the method of modulation used, $E_S$ is modulated in amplitude (ASK), frequency (FSK), or phase (PSK, DPSK).

One of the output ports of the coupler K delivers the useful optical signal $$E_K = |E_K|(\exp(ift))$$

where $$f = v - w$$

and the other output port provides the signal $-K_K$, which both have the shot noise of the local oscillator LO superimposed thereon as in-phase components. The two output ports of the coupler K are connected to a unit Q whose tow outputs provide a signal $$Q_x = |Q|\sin ft$$

and a signal $$Q_y = |Q|\cos ft$$

respectively, which no longer have the LO shot noise superimposed thereon. The signals $Q_x$, $Q_y$ are fed to a demodulator D, which delivers the demodulated useful signal N, a control signal $S_W$ for adjusting the polarization angle of the light $E_S$ by means of a controller RW and the polarization control element PW, and a control signal $S_E$ for adjusting the ellipticity of the light $E_S$ by means of a controller RE and the polarization control element PE.

The unit Q contains two polarization-selective beam splitters P1, P2, which are fed with the signals $E_K$ and $-E_K$, respectively. The two beam splitters P1, P2 are each followed by two optical-to-electric transducers W1–W4, and each of the transducers W1–W4 has its output connected to a front-end amplifier V1–V4. The output of the front-end amplifier V1 is connected to the noninverting input of an amplifier VX, and that of the front-end amplifier V3 to the inverting input. The output of the front-end amplifier V2 is connected to the noninverting input of an amplifier VY, and that of the front-end amplifier V4 to the inverting input. The amplifier VX delivers the signal $Q_x$, and the amplifier VY delivers the signal $Q_y$.

The demodulator D for demodulating AK-modulated signals contains a mixer M which multiplies the signals $Q_x$, $Q_y$ together to form the control signal $S_E$. It also includes a full-wave rectifier or other non-linear device G1, which is fed with the signal $Q_x$, and a full-wave rectifier of other non-linear device G2, which is fed with the signal $Q_y$. The outputs of the full-wave rectifier are subtracted one from the other by a subtracter S to form the control signal SW, and are added together by an adder A to form the useful signal N.

In an alternative embodiment of the demodulator D (as shown in FIG. 1a), the non-linear devices G1, G2 may be multipliers M1, M2 which square the signals $Q_x$, $Q_y$.

To demodulate DPSK-modulated signals, the signal $Q_x$ is applied to one of these multipliers, and the signal $Q_y$ to the other, both in undelayed form and through delay elements D1, D2 providing a delay equal to one bit-click period.

Figure 2:
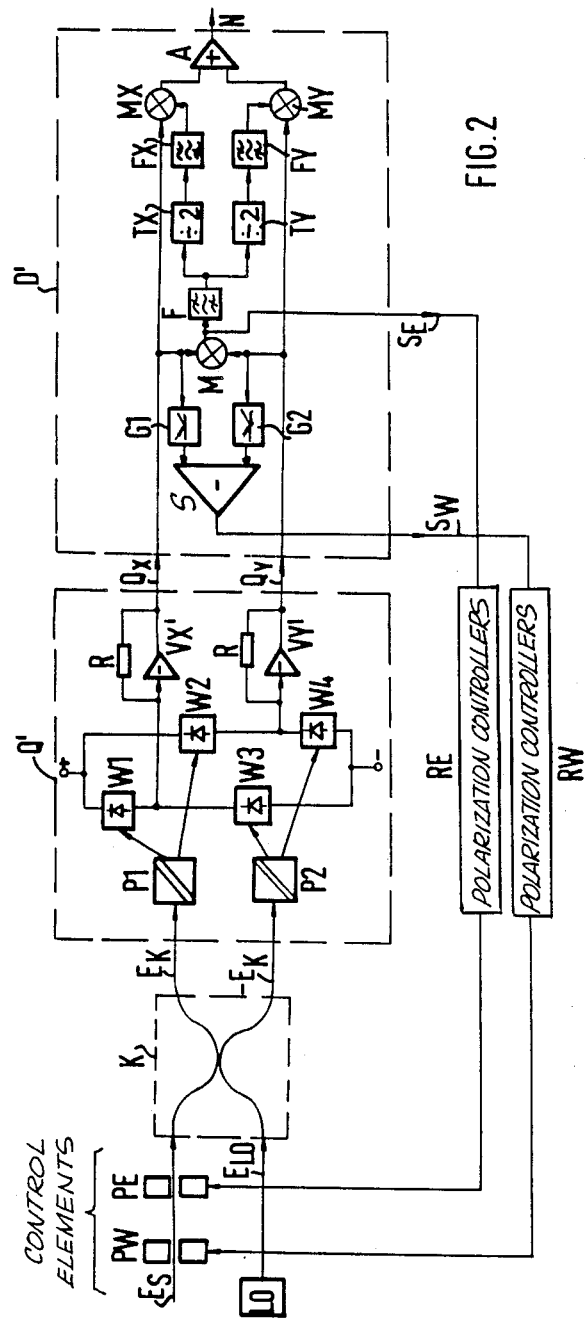
FIG. 2 shows an optical receiver for PSK-modulated signals.

FIG. 2 shows an optical heterodyne receiver which differs from that of FIG. 1 by a unit Q' and a demodulator D' suitable for PSK-modulated signals.

The unit Q', like the unit Q of FIG. 1, contains two polarization-selective beam splitters P1 and P2, which are fed with the signals $E_K$ and $-E_K$, respectively, and are each followed by two optical-to-electric transducers W1-W4. The transducers W1 and W3 are electrically in series, and this series combination is shunted by the series combination of the transducers W2 and W4. The junction of the transducers W1 and W3 and that of the transducers W2 and W4 are connected to inverting amplifiers VX' and VY', respectively, which each have a feedback resistor R connected thereto and deliver the signals $Q_X$ and $Q_Y$, respectively.

In the demodulator D', the control signals $S_E$, $S_W$ are produced in the same way as in the demodulator D of FIG. 1. The output signal of the mixer M has a wave form proportional to sin 2ft. It passes through a band-pass spectral filter F, which is tuned to 2f, and is then applied to two frequency dividers TX, TY consisting of two flip-flops which trigger on different edges and provide square-wave voltages. Each of the flip-flops is followed by a filter FX, FY which passes only the fundamental contained in the respective square-wave voltage. The filter FX supplies a voltage sin ft to a mixer MX which is also fed with the signal $Q_x$, and the filter FY supplies a voltage cos ft to a mixer MY, which is also fed with the signal $Q_y$. The outputs of the mixers MX, MY are fed to an adder A, which delivers the useful signal N.

FIG. 3 shows an optical heterodyne receiver which differs from that of FIG. 1 by a unit Q'' and a demodulator D'' suitable for FSK-modulated signals.

The unit Q'' is obtained by omitting the second polarization-selective beam splitter P2, the transducers W3, W4, and the amplifiers V3, V4, VX, VY in the unit Q of FIG. 1.

The demodulator D'' is obtained by placing two band-pass filters BX, BY ahead of the rectifiers G1, G2 in the demodulator D of FIG. 1. These filters are tuned to the frequencies used and change the FSK-modulated signal into an A modulated signal.

Not shown in FIG. 3 is an automatic frequency control for the local oscillator LO which may be necessary to ensure that the center frequencies of the signals $Q_X$, $Q_Y$, agree with those of the band-pass filters BX, BY.

The units Q, Q', A'' are suitable for each of the embodiments because they are independent of the method of modulation used. In another alternative embodiment, the polarization-selective beam splitter P1 of the unit Q'' may be replaced with two polarizers each connected to one of the outputs of the coupler K and differing in orientation by 90°. Such polarizers are easier to implement with fiber optics and integrated optical technology than polarization-selective beam splitters.

The present invention has been described above with regard to the structure, function and use of certain presently contemplated specific embodiments of the invention. It should be appreciated by those skilled in the art that many modifications and variations are possible. Accordingly the exclusive rights afforded hereby should be broadly construed, limited only by the spirit and scope of the appended claims.

What is claimed is:

1. An optical heterodyne receiver for receiving an input signal in the form of polarized light modulated with a useful signal, said receiver comprising:
   a source of circularly polarized light,
   an optical coupler having at least two input ports and at least two output ports, a first one of said input ports being coupled to the said polarized light modulated with a useful signal and a second one of said input ports being coupled to said source of circularly polarized light;
   an optical to electrical converter responsive to the output of said coupler, said converter comprising:
      first polarization selective means coupled to the first of said two output ports for producing first and second light beams which differ in polarization angle by 90°
      second polarization selective means coupled to the second of said two output ports for producing third and fourth light beams which also differ in polarization angle by 90°
      first and second optical-to-electric transducers respectively responsive to said first and second light beams; for providing first and second electrical signals
      third and fourth optical-to-electric transducers respectively responsive to said third and fourth light beams, for providing third and fourth electrical signals and
      means for deriving first and second radio-frequency output signals differing in phase by approximately 90° by subtraction of said third and fourth electrical signals from said first and second electrical signals, respectively,
   a demodulator responsive to said first and second radio-frequency output signals for delivering a demodulated output signal and
   polarization control means for controlling the polarization angle and the ellipticity of the polarized light modulated with a useful signal such that completely linearly polarized light with a constant polarization angle of 45° or 135° is obtained at the point where said modulated polarized light is input to said coupler, said polarization control means comprising:
      a first polarization control element responsive to the amplitude difference between said first and second radio-frequency output signals for controlling the polarization angle of the modulated polarized light before it enters said coupler, and
      a second polarization control element responsive to the phase angle between said first and second radio-frequency output signals for controlling the polarization ellipticity of the modulated polarized light before it enters said coupler.

2. The optical heterodyne receiver of claim 1 wherein said first and second polarization selective means each comprises at least one polarizer respectively connected to the respective one of said output ports.

3. An optical heterodyne receiver as claimed in claim 1 wherein said demodulator comprises means for
   full-wave rectification and addition of said first and second radio-frequency output signals
to thereby obtain said demodulated output signal.

4. An optical heterodyne receiver as claimed in claim 1 wherein said demodulator comprises means for squaring and adding said first and second radio-frequency output signals to thereby obtain said output signal.

5. An optical heterodyne receiver as claimed in claim 1 wherein said demodulator comprises means for multiplying each of said first and second radio-frequency output signals by the same but delayed radio-frequency output signal to obtain two resulting radio-frequency signals and adding said two resulting radio-frequency signals to thereby obtain said output signal.

6. An optical heterodyne receiver as claimed in claim 1 wherein said demodulator comprises means for first converting said first and second radio-frequency output signals into respective first and second ASK-modulated signals by band-pass filtering and then full-wave rectification and addition of said first and second ASK-modulated signals to thereby obtain said demodulated output signal.

7. An optical heterodyne receiver as claimed in claim 1 wherein said demodulator comprises means for first converting said first and second radio-frequency output signals into respective first and second ASK-modulated signals by band-pass filtering and then squaring and adding said first and second AK-modulated signals to thereby obtain said demodulated output signal.

8. An optical heterodyne receiver as claimed in claim 1 wherein said demodulator comprises means responsive to said first and second radio-frequency output signals for deriving first and second intermediate frequency signals of the form sin ft and cos ft, mixing said first and second intermediate frequency signals with said first and second radio-frequency output signals to provide first and second mixer output signals of the form $\pm\sin^2 ft$ and $\pm\cos^2 ft$, and adding said first and second mixer output signals together to thereby obtain said demodulated output signal.

* * * * *

UNITED STATES PATENT AND TRADEMARK OFFICE
CERTIFICATE OF CORRECTION

PATENT NO. :   4,856,093
DATED      :   August 8, 1989
INVENTOR(S) :  Friedemann Mohr It is certified that error appears in the above-identified patent and that said Letters Patent is hereby corrected as shown below:

In the Specification:

Column 1, line 43, change "AK-" to -- ASK --.
Column 1, line 50, change "A-modulated" to
                    -- ASK-modulated --.

Column 2, line 20, change "-$K_K$" to -- -$E_K$ --.
Column 2, line 24, change "tow" to -- two --.
Column 2, line 55, change "AK" to -- ASK --.
Column 2, line 60, change "of" to -- or --.

Column 3, line 2, change "$Q_x$is" to -- $Q_x$ is --.
Column 3, line 5, change "bit-click" to -- bit-clock --.
Column 3, line 21, change "$S_w$are" to -- $S_w$ are --.
Column 3, line 49, before "modulated" change "A" to -- ASK --.
Column 3, line 54, change "A''" to -- Q'' --.

In the Claims

Column 6, line 6, before "second" change "AK-" to -- ASK --.

Signed and Sealed this

Fourth Day of September, 1990

Attest:

HARRY F. MANBECK, JR.

Attesting Officer     Commissioner of Patents and Trademarks